United States Patent
Jong et al.

(10) Patent No.: US 8,637,603 B2
(45) Date of Patent: Jan. 28, 2014

(54) POLYSILOXANE RESIN COMPOSITION

(75) Inventors: Shean-Jeng Jong, Taichung (TW); Yun-I Tsai, Taichung (TW); Yu-Tsai Hsieh, Taichung (TW)

(73) Assignee: Daxin Materials Corp., Taichung (TW)

( * ) Notice: Subject to any disclaimer, the term of this patent is extended or adjusted under 35 U.S.C. 154(b) by 0 days.

(21) Appl. No.: 13/477,515

(22) Filed: May 22, 2012

(65) Prior Publication Data

US 2012/0302691 A1  Nov. 29, 2012

(30) Foreign Application Priority Data

May 25, 2011 (TW) .............................. 100118318 A

(51) Int. Cl.
*C08L 83/04* (2006.01)
*C08K 3/22* (2006.01)

(52) U.S. Cl.
USPC ........... 524/588; 524/423; 524/430; 524/432; 524/433; 525/477

(58) Field of Classification Search
None
See application file for complete search history.

(56) References Cited

U.S. PATENT DOCUMENTS

| | | | | |
|---|---|---|---|---|
| 8,237,189 | B2 * | 8/2012 | Taguchi et al. | 257/100 |
| 8,455,899 | B2 * | 6/2013 | Taguchi et al. | 257/98 |
| 2010/0081748 | A1 * | 4/2010 | Taguchi et al. | 524/433 |
| 2010/0213502 | A1 * | 8/2010 | Kashiwagi et al. | 257/100 |
| 2010/0247460 | A1 * | 9/2010 | Lin et al. | 424/59 |

FOREIGN PATENT DOCUMENTS

| | | |
|---|---|---|
| JP | 2010-106243 | 5/2010 |
| JP | 2011-032392 | 2/2011 |
| JP | 2011-32392 | 2/2011 |

* cited by examiner

*Primary Examiner* — Marc Zimmer
(74) *Attorney, Agent, or Firm* — Nixon & Vanderhye P.C.

(57) ABSTRACT

A polysiloxane resin composition contains: a first polysiloxane having an average compositional formula of $R^4_a(OR^5)_b(OH)_cSiO_{(4-a-b-c)/2}$; a second polysiloxane different from the first polysiloxane and selected from cyclic polysiloxane, linear polysiloxane with a weight average molecular weight of less than 3000, and a combination thereof; a white pigment; an inorganic filler; and a catalyst.

7 Claims, No Drawings

POLYSILOXANE RESIN COMPOSITION

CROSS-REFERENCE TO RELATED APPLICATION

This application claims priority of Taiwanese application No. 100118318, filed on May 25, 2011.

BACKGROUND OF THE INVENTION

1. Field of the Invention

This invention relates to a polysiloxane resin composition, specifically, a polysiloxane resin composition comprising first and second polysiloxanes, in which the second polysiloxane is composed of a cyclic or linear polysiloxane. The cured polysiloxane resin composition has good flexural strength and high reflectance properties.

2. Description of the Related Art

Optoelectronic devices, such as light emitting diodes (LEDs), are usually protected by a case or a package made from resin materials.

Polyphthalamide (PPA) is the typical resin that is used for packaging an optoelectronic device. However, physical properties of the resin are likely to deteriorate after a long period of usage. For example, the generated heat due to the operation of the optoelectronic device leads to photodegradation of the resin, which consequently leads to yellowing of the resin and decreased output power of the optoelectronic device. It occurs especially in high energy LEDs, such as UV LEDs, white light LEDs, and blue light LEDs. Thus, packaging materials with high reflectance and heat resistance are necessary.

US Application Publication No. 2010/0081748 discloses a silicone resin composition for optical semiconductor devices. The silicone resin composition is composed of (A) 100 parts by mass of an organopolysiloxane with an average compositional formula of $(CH_3)_a Si(OR^1)_b (OH)_c O_{(4-a-b-c)/2}$, (B) 3 to 200 parts by mass of a white pigment, (C) 400 to 1000 parts by mass of an inorganic filler, (D) 0.01 to 10 parts by mass of a condensation catalyst, and (E) 2 to 50 parts by mass of an organopolysiloxane having a linear diorganopolysiloxane moiety represented by the following formula,

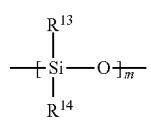

wherein $R^{13}$ and $R^{14}$ are, independently of each other, a functional group selected from the group consisting of a hydroxyl group, an alkyl group having 1 to 3 carbon atoms, a cyclohexyl group, a vinyl group, a phenyl group and an alkyl group, wherein m is an integer ranging from 5 to 50.

By gel permeation chromatography (GPC) measurement with the polystyrene standard, the organosiloxane (A) has a weight average molecular weight, ranging from 500 to 20,000, preferably from 1,000 to 10,000, and more preferably from 2,000 to 8,000. Similarly, the average molecular weight of component (E), determined by GPC, is preferably from 3,000 to 1,000,000, more preferably, from 10,000 to 100,000.

As shown in Table 1 of the U.S. application, the bending strength of a specimen made from the aforesaid composition is inversely correlated with the amount of the linear organopolysiloxane (E). Noted, adding the linear organopolysiloxane with molecular weight over 3000 could lower the mechanical properties of silicone resin.

SUMMARY OF THE INVENTION

According to one aspect of this invention, a polysiloxane resin composition comprises:

(A) a polysiloxane component including:
  a first polysiloxane having an average compositional formula of $R^4_a(OR^5)_b(OH)_c SiO_{(4-a-b-c)/2}$, wherein $R^4$ is a monovalent group having 1 to 20 carbon atoms, $R^5$ is hydrogen or a monovalent group having 1 to 4 carbon atoms, and a, b, and c satisfy the following equations: $0.8 \le a \le 1.5$, $0 \le b \le 0.3$, $0.001 \le c \le 0.5$, and $0.801 \le a+b+c < 2$; and
  a second polysiloxane different from the first polysiloxane and selected from the group consisting of cyclic polysiloxane, linear polysiloxane with a weight average molecular weight of less than 3000, and a combination thereof;

(B) a white pigment;
(C) an inorganic filler;
(D) a catalyst.

Another objective of this invention is to provide an optoelectronic device package made from the aforesaid polysiloxane resin composition.

DETAILED DESCRIPTION OF THE PREFERRED EMBODIMENTS

This invention provides a polysiloxane resin composition comprising (A) a polysiloxane component, (B) a white pigment, (C) an inorganic filler; (D) a catalyst; and (E) additives.

Detailed descriptions for the components of the polysiloxane resin composition are provided in the following.

(A) Polysiloxane Component

The polysiloxane component (A) includes a first polysiloxane (A1) and a second polysiloxane (A2).

(A1) First Polysiloxane

The first polysiloxane has an average compositional formula of $R^4_a (OR^5)_b (OH)_c SiO_{(4-a-b-c)/2}$, wherein $R^4$ is a monovalent group having 1 to 20 carbon atoms, $R^5$ is hydrogen or a monovalent group having 1 to 4 carbon atoms, and a, b, and c satisfy the following equations: $0.8 \le a \le 1.5$, $0 \le b \le 0.3$, $0.001 \le c \le 0.5$, and $0.801 \le a+b+c < 2$.

The first polysiloxane (A1) can be obtained by hydrolysis and condensation of alkoxy silane monomers or chlorosilane monomers. Regarding methods for preparing the first polysiloxane using the alkoxy Lane monomers, one may refer to the examples disclosed in TW Application Publication No. 200940649, which is hereby incorporated by reference in its entirety. Preferably, the alkoxy silane monomer is methyltrimethoxysilane.

(A2) Second Polysiloxane

The second polysiloxane (A2) is selected from the group consisting of cyclic polysiloxane (A21), linear polysiloxane (A22), and the combination thereof.

(A21) Cyclic Polysiloxane

The cyclic polysiloxane is represented by the following formula (I),

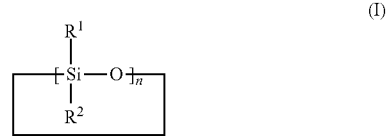

Wherein, in formula (I), $R^1$ and $R^2$ are independently hydrogen, a $C_1$ to $C_4$ alkyl group, a benzyl group, halogen atom, a hydroxyl group, a $C_1$ to $C_4$ alkoxy group or —X—Si$(OR^3)_3$, X being $C_1$-$C_4$ alkylene, $R^3$ being $C_1$-$C_4$ alkyl;

n is an integer ranging from 3 to 6, with the proviso that, at least one of the $R^1$ and $R^2$ among all repeating units in formula (I) is —X—Si$(OR^3)_3$, and that $R^1$ and $R^2$ cannot be —X—Si$(OR^3)_3$ at the same time in any of the repeating units in formula (I).

Examples of the cyclic polysiloxane (A21) include:

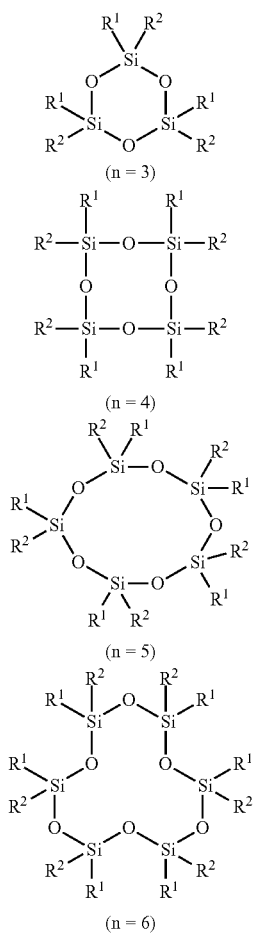

When the second polysiloxane (A2) is the cyclic polysiloxane (A21), based on 100 parts by weight of the first polysiloxane (A1), the cyclic polysiloxane (A21) is present from 2 to 50 parts by weight; more preferably, from 2 to 20 parts by weight.

(A22) Linear Polysiloxane

The linear polysiloxane has a weight average molecular weight of less than 3000 and is represented by $R^6OSiR^7_2O(SiR^7_2O)_dSiR^7_2OR^6$, wherein $R^6$ is hydrogen or a monovalent group having 1 to 4 carbon atoms, $R^7$ is a monovalent group having 1 to 20 carbon atoms, and d is an integer ranging from 0 to 40.

Preferably, when the second polysiloxane (A2) is the linear polysiloxane (A22), based on 100 parts by weight of the first polysiloxane (A1), the linear polysiloxane (A22) is present from 2 to 50 parts by weight; more preferably, from 2 to 20 parts by weight. When the linear polysiloxane (A22) is less than 2 parts by weight, it results in insufficient flexural strength of the polysiloxane resin composition after curing. Appropriate amounts of the linear polysiloxane (A22) increase the flexural strength of the polysiloxane resin composition.

Preferably, when the second polysiloxane (A2) is the combination of the cyclic polysiloxane (A21) and the linear polysiloxane (A22), based on 100 parts by weight of the first polysiloxane (A1), the cyclic polysiloxane (A21) is present in 1 to 30 parts by weight, and the linear polysiloxane (A22) is present in 1 to 30 parts by weight; more preferably, the cyclic polysiloxane (A21) is present in 1 to 20 parts by weight, and the linear polysiloxane (A22) is present in 1 to 20 parts by weight.

(B) White Pigment

The white pigment is used to increase whiteness.

Regarding methods for using the white pigment and the examples thereof, one may refer to the disclosure in Taiwanese Application Publication No. 200940649.

The white pigment can be pre-treated by e.g., reacting with oxyhydroxides of aluminum and silicon in order to obtain a better dispersion and compatibility with the polysiloxane component (A) and the inorganic filler (C).

Preferably, based on 100 parts by weight of the first polysiloxane (A1), the white pigment (B) is present from 3 to 200 parts by weight; more preferably, from 110 to 116 parts by weight.

(C) Inorganic Filler

Regarding methods of using the inorganic filler and the examples thereof, one may refer to the disclosure in Taiwanese Application Publication No. 200940649.

Preferably, based on 100 parts by weight of the first polysiloxane (A1), the inorganic filler (C) is present from 150 to 240 parts by weight; more preferably, from 167 to 222 parts by weight.

(D) Catalyst

The catalyst is to promote curing of the first and second polysiloxanes of the polysiloxane component (A).

Regarding methods of using the catalyst and the examples thereof, one may refer to the disclosure in Taiwanese Application Publication No. 200940649.

The appropriate amount of the catalyst can provide effective curing and stability during the reaction.

Preferably, based on 100 parts by weight of the first polysiloxane (A1), the catalyst (D) is present from 0.01 to 20 parts by weight; more preferably, from 5.5 to 7.5 parts by weight.

(E) Additives

Depending on the subsequent application of the polysiloxane resin composition, addition of the additives is optional. Regarding methods of using the additives and the examples thereof, one may refer to the disclosure in Taiwanese Application Publication No. 200940649.

The aforementioned polysiloxane resin composition can be cured to prepare a package or a case for an optoelectronic device.

Specifically, curing of the polysiloxane resin composition can be achieved by thermal curing. For example, the curing process can be conducted under 150° C. to 185° C. for 30 to 180 seconds, and then under 150° C. to 180° C. for 2 to 20 hours (post-curing).

The reflectance of the polysiloxane resin composition after curing is measured. The reflectance of the cured polysiloxane resin composition at 450 nm wavelength is 70% to 100%; preferably, from 80% to 100%; more preferably, from 85% to 100%. Furthermore, the polysiloxane resin composition after curing is subjected to an anti-yellowing test under high temperature. The results reveal that, after 24 hours under 150° C., the reflectance is 70% to 100%; preferably, from 80% to 100%; more preferably, from 85% to 100%.

In addition, the cured polysiloxane resin composition was exposed to a high pressure mercury lamp (60 milliwatts/centimeter) at wavelength of 365 nm peak for 24 hours, the reflectance is 70% to 100%; preferably, from 80% to 100%; more preferably, from 85% to 100%.

The reflectance performance directly represents the anti-yellowing effect of the polysiloxane resin. Thus, in view of the above, the superior reflectance after the exposure under 450 nm wavelength, under 150° C. for 24 hours or under 365 nm for 24 hours indicates superior anti-yellowing properties of the polysiloxane resin composition.

EXAMPLES

This invention will be further described by way of the following examples. However, it should be understood that the following examples are solely intended for the purpose of illustration and should not be construed as limiting the invention in practice.

<Source of Chemicals>
1. Vinyltrimethoxysilane: purchased from Shin-Etsu Chemical Co., Ltd., catalog number KBM-1003.
2. 2,4,6,8-Tetramethyl-2,4,6,8-tetrahydro-cyclotetra siloxane (hereinafter referred to as "D4H"): purchased from Runhe Chemical Industry Co., Ltd., catalog number: RH-H102.
3. Linear polysiloxane (A22): purchased from Jiaxing United Chemical Co., Ltd., catalog number: UC206, colorless transparent silicone oil. Approximate molecular weight: 750. Experimental error in gel permeation chromatography is 10%. The formula is represented as follows:

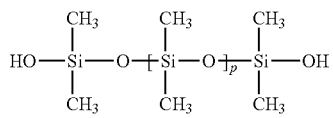

4. White pigment: titanium dioxide, purchased from Ishihara Sangyo K. K., catalog number CR-95, rutile type, average particle size being 0.28 μm.
5. Inorganic filler: spherical fused silica (please confirm), purchased from Korea Semiconductor materilas Co., Ltd., catalog number SS-0183, average particle size being 16 μm.
6. Condensation catalyst: zinc benzoate.

Preparation Example 1

Synthesis of First Polysiloxane (A1)

315 g of 1.8 wt % hydrochloric acid aqueous solution, 300 g isopropanol, and 1000 g toluene were placed in a 3 L flask and were cooled in an ice bath until the resulting mixture in the flask fell below 15° C. 500 g (3.676 mol) of methyltrimethoxysilane was added dropwise to the resulting mixture with constant stirring the temperature was kept under 15° C. The mixture was allowed to react for 18 hours. Subsequently, the organic layer of the mixture was separated by washing with water until the washed water reached neutral pH. The organic layer was further subjected to vacuum concentration and then vacuum drying, thereby obtaining a first polysiloxane (A1) in the form of transparent solid (212 g). The average formula of the first polysiloxane (A1) is represented by the following formula, $MeSi(OMe)_{0.0495}$ $(OPr\text{-}i)_{0.0193}$ $(OH)_{0.15}O_{1.3906}$, in which OPr-i indicates isopropoxy. The first polysiloxane (A1) has a weight molecular weight of 3100 and a glass transition temperature (Tg) of 57° C.

Preparation Example 2

Synthesis of Second Polysiloxane (A2)

Synthesis of Cyclic Polysiloxane (A21)-D4HVi

In a one liter flask, 584 g (5 mole) of vinyltrimethoxysilane was mixed with 0.1 g of platinum/1-octanol solution, in which platinum had a concentration of 5000 ppm and acted as a catalyst.

The temperature of the flask was raised to 70° C. under nitrogen gas. 192 g of DH4 was added dropwise over a period of eight hours while the flask was maintained at 70° C. The mixture was allowed to react for 16 hours at 70° C. After completion of the reaction, the remaining vinyltrimethoxysilane was removed, and the cyclic polysiloxane (A21), DH4Vi, was thus obtained. The chemical structure was determined by IR and $^1$H-NMR, and is represented by the following formula.

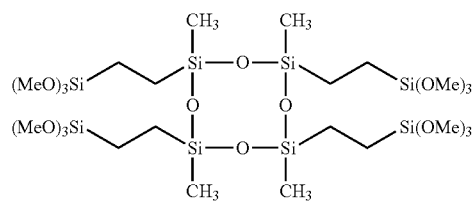

Example 1

Preparation of Polysiloxane Resin Composition 20 g of the first polysiloxane (A1) obtained from <Preparation Example 1>, 1.2 g of UC206 (A22), 2 g of D4HVi (A21) obtained from <Preparation Example 2>, 22.8 g of titanium oxide, 45 g of spherical fused silica (please confirm), and 1.4 grams of zinc benzoate were blended at 60° C. in a dual roll milling machine until evenly mixed. After cooling, the resultant mixture was ground and a polysiloxane resin composition was thus obtained. The proportion of each component in the polysiloxane resin composition is listed in Table 1 and is shown as part by weight.

Examples 2 and 3 and Comparative Example 1

The polysiloxane resin compositions for Examples 2 and 3 and Comparative Example 1 were prepared in a manner are similar to that of Example 1, except that the amount of each composition is different (SPP Table 1).

<Preparation of Test Films>

The polysiloxane resin composition thus obtained was placed in a three-piece mold, and was hot pressed under 150° C. for 10 minutes. A test film derived from the polysiloxane resin composition was thus obtained.

<Standard Testing>
1. Flexural strength and flexural modulus: determined according to ASTM D790.
2. Viscosity: determined using a rheometer (from TA instruments, catalog number AR-G2) at 70° C.
3. Hardness: a test film with a diameter of 25 mm and a thickness of 2 mm was used and hardness thereof was determined using Shore durometer D.
4. Coefficient of linear thermal expansion (hereinafter referred to as CIE) and glass transition temperature (Tg): a test film with a surface area of 10 mm×10 mm and a thickness of 3 mm was analyzed with a thermomechanical analyzer (TMA)(from TA Instruments Q400). The test film was heated from 0° C. to 400° C. at a rate of 10° C. per minute. Tg, CTE 1 and CTE 2 were recorded. CTE 1: coefficient of linear thermal expansion at temperatures below Tg. CTE 2: coefficient of linear thermal expansion at temperatures above Tg.
5. Reflectance: a test film with a diameter of 25 mm and a thickness of 2 mm was used. A spectrophotometer (purchased from JASCO, catalog number UV-670) was used to determine the reflectance at a wavelength of 450 nm (scanning range from 300 to 800 nm). In order to determine thermoresistant and anti-ultraviolet properties, the reflectance was measured under 150° C. for 24 hours and under ultra-violet (UV) rays with wavelength of 365 nm peak for 24 hours using high pressure mercury lamp (60 watts/centimeter), respectively.

Results of the standard testing are shown in Table 1.

TABLE 1

| | | | | Example 1 | Example 2 | Example 3 | Comparative Example 1 |
|---|---|---|---|---|---|---|---|
| Composition (parts by weight) | (A1) | First polysiloxane | | 100 | 100 | 100 | 100 |
| | (A2) | (A21) Cyclic polysiloxane | D4HVi | 11.11 | — | — | — |
| | | (A22) Linear polysiloxane | UC206 | — | 11.11 | 11.11 | — |
| | (B) | White pigment | CR-95 | 111.11 | 111.11 | 166.7 | 100 |
| | (C) | Inorganic filler | SS-0183 | 222.2 | 222.2 | 166.7 | 200 |
| | (D) | Condensation catalyst | zinc benzoate | 7.11 | 7.11 | 7.11 | 6.4 |
| Standard testing | Flexural strength (MPa) | | | 66 | 49.5 | 59 | 39 |
| | Flexural modulus (GPa) | | | 9.3 | 8.3 | 9.1 | 6.5 |
| | Viscosity (Pa·s)/70° C. | | | 1723 | 3697 | 3237 | — |
| | Hardness (Shore D) | | | 88 | 87 | 90 | 90 |
| | CTE1 (ppm) | | | 29.5 | 36.6 | 31.9 | — |
| | CTE2 (ppm) | | | 83.3 | 72.4 | 115.1 | — |
| | Tg (° C.) | | | 64 | 59.5 | 52.5 | — |
| | Reflectance (%) | Initial at 450 nm | | 94 | 93 | 94 | 93 |
| | | After 150° C./24 h at 450 nm | | 94 | 93 | 94 | 93 |
| | | After UV rays/24 h at 365 nm | | 94 | 93 | 94 | 93 |

"—" indicates components not added or physical properties not measured.

As shown in Table 1, the polysiloxane resin obtained from Examples 1 to 3 have a flexural strength in the range of 49.5 to 66 MPa, hardness in the range of 87 to 90, and reflectance in the range of 93% to 94%, which all meet industrial requirements.

As shown in Table 1, the polysiloxane component (A), white pigment (B), inorganic filler (C) and condensation catalyst (D) in Examples 1 to 3 all have the ratio of 1:1:2:0.64. However, when comparing Example 1 to Examples 2 and 3, the presence of cyclic polysiloxane (A21) results in a higher flexural strength than using linear polysiloxane (A22) as the second polysiloxane (A2).

As shown in Table 1, without the addition of second polysiloxane (A2), as in Comparative Example 1, the flexural strength is lower than that of Example 1 which contains cyclic polysiloxane (A21).

To sum up, the polysiloxane resin composition provided by this invention, which includes the second polysiloxane (A2), provides superior flexural strength, with the hardness and reflectance meeting industrial requirements.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A polysiloxane resin composition, comprising:
(A) a polysiloxane component including:
a first polysiloxane having an average compositional formula of $R^4_a(OR^5)_b(OH)_cSiO_{(4-a-b-c)/2}$, wherein $R^4$ is a monovalent group having 1 to 20 carbon atoms, $R^5$ is hydrogen or a monovalent group having 1 to 4 carbon atoms, and a, b, and c satisfy the following equations: $0.8 \leq a \leq 1.5$, $0 \leq b \leq 0.3$, $0.001 \leq c \leq 0.5$, and $0.801 \leq a+b+c < 2$; and a cyclic polysiloxane represented by the formula (I)

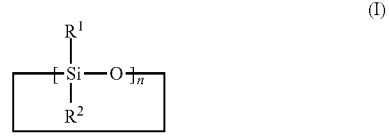

(I)

wherein, in formula (I), $R^1$ and $R^2$ are independently hydrogen, $C_1$ to $C_4$ alkyl group, benzyl group, halogen atom, hydroxyl group, $C_1$ to $C_4$ alkoxy group or —X—Si(OR$^3$)$_3$, X being $C_1$-$C_4$ alkylene, R$^3$ being $C_1$-$C_4$ alkyl; and n is an integer ranging from 3 to 6, with the proviso that, at least one of the R$^1$ and R$^2$ among all repeating units in formula (I) is —X—Si(OR$^3$)$_3$, and that R$^1$ and R$^2$ cannot be —X—Si(OR$^3$)$_3$ at the same time in any of the repeating units in formula (I);

(B) a white pigment;
(C) an inorganic filler; and
(D) a catalyst.

2. The polysiloxane resin composition according to claim 1, wherein said linear polysiloxane is represented by R$^6$OSiR$^7_2$O(SiR$^7_2$O)$_d$SiR$^7_2$OR$^6$, wherein R$^6$ is hydrogen or a monovalent group having 1 to 4 carbon atoms, R$^7$ is a monovalent group having 1 to 20 carbon atoms, and d is an integer ranging from 0 to 40.

3. An optoelectronic device package made from the polysiloxane resin composition of claim 1.

4. A) a polysiloxane component including:
(A) a first polysiloxane having an average compositional formula of R$^4_a$(OR$^5$)$_b$(OH)$_c$SiO$_{(4-a-b-c)/2}$, wherein R$^4$ is a monovalent group having 1 to 20 carbon atoms, R$^5$ is hydrogen or a monovalent group having 1 to 4 carbon atoms, and a, b, and c satisfy the following equations: $0.8 \leq a \leq 1.5$, $0 \leq b \leq 0.3$, $0.001 \leq c \leq 0.5$, and $0.801 \leq a+b+c < 2$; and a cyclic polysiloxane;

(B) a white pigment;
(C) an inorganic filler; and
(D) a catalyst.

5. The polysiloxane resin composition according to claim 4, wherein, based on 100 parts by weight of said first polysiloxane, said cyclic polysiloxane is 2 to 20 parts by weight.

6. A) a polysiloxane component including:
(A) a first polysiloxane having an average compositional formula of R$^4_a$(OR$^5$)$_b$(OH)$_c$SiO$_{(4-a-b-c)/2}$, wherein R$^4$ is a monovalent group having 1 to 20 carbon atoms, R$^5$ is hydrogen or a monovalent group having 1 to 4 carbon atoms, and a, b, and c satisfy the following equations: $0.8 \leq a \leq 1.5$, $0 \leq b \leq 0.3$, $0.001 \leq c \leq 0.5$, and $0.801 \leq a+b+c < 2$; and a second polysiloxane comprising, based on 100 parts by weight of said first polysiloxane, 1 to 30 parts by weight of a cyclic polysiloxane and 1 to 30 parts by weight of a linear polysiloxane with a weight-average molecular weight of less than 3,000;

(B) a white pigment;
(C) an inorganic filler; and
(D) a catalyst.

7. The polysiloxane resin composition according to claim 6, wherein, based on 100 parts by weight of said first polysiloxane, said cyclic polysiloxane is 1 to 20 parts by weight, and said linear polysiloxane is 1 to 20 parts by weight.

* * * * *